L. BERRY.
POTATO DIGGER.
No. 107,327.  2 Sheets—Sheet 2.
Patented Sept. 13, 1870.
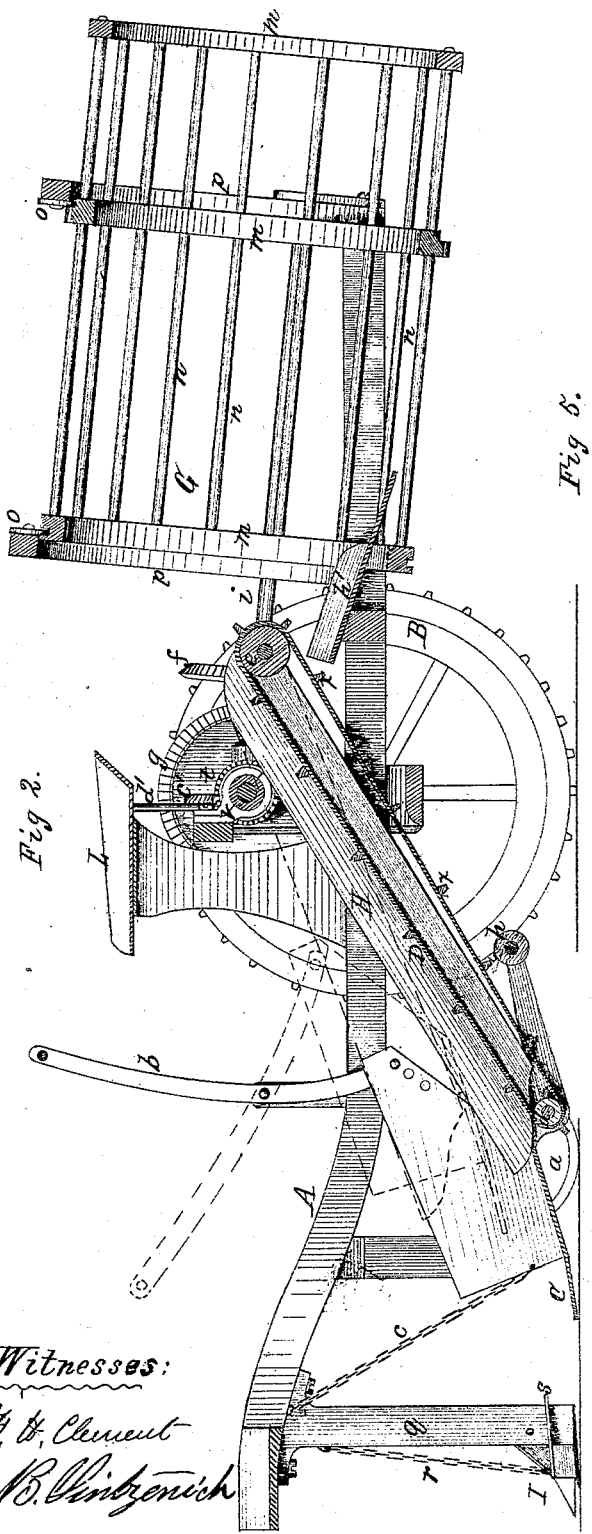
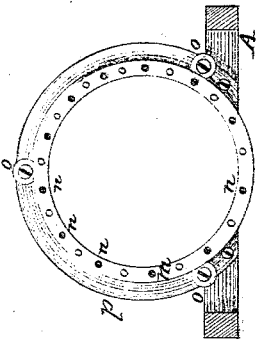
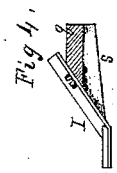
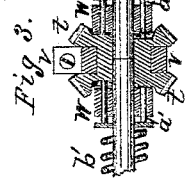
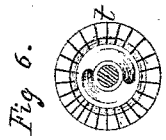
Witnesses:
Inventor:
Leander Berry

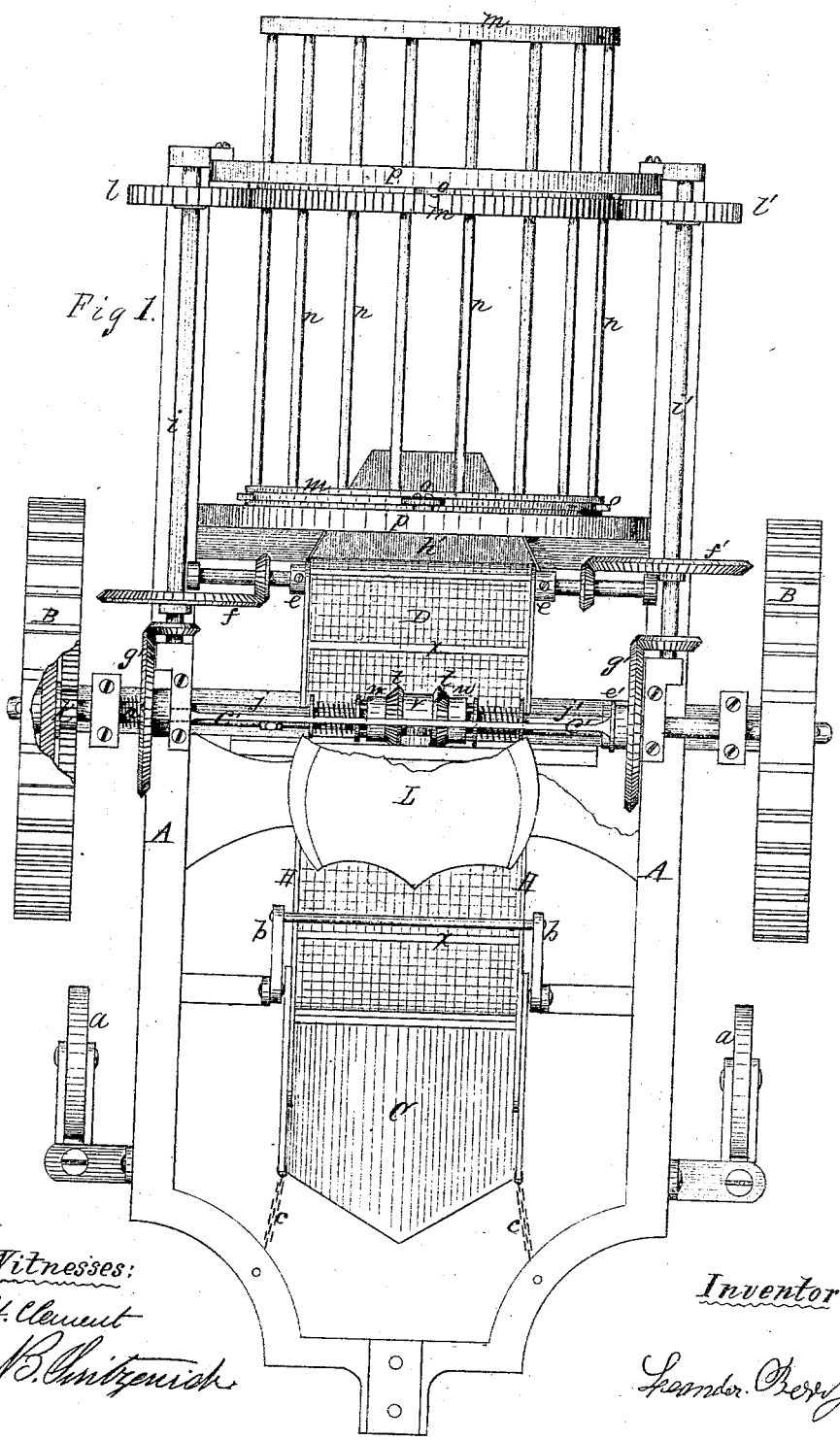

UNITED STATES PATENT OFFICE.

LEANDER BERRY, OF CLYDE, NEW YORK, ASSIGNOR TO HIMSELF AND EDWARD BURRELL, OF SAME PLACE.

IMPROVEMENT IN POTATO-DIGGERS.

Specification forming part of Letters Patent No. 107,327, dated September 13, 1870.

*To all whom it may concern:*

Be it known that I, LEANDER BERRY, of Clyde, in the county of Wayne and State of New York, have invented certain Improvements in Potato-Diggers, of which the following is a specification.

The nature of my invention consists chiefly in the combination of a digging-shovel, a carrier-belt, and a revolving separator, and in certain devices for operating the same.

In the drawings, Figure 1 is a plan view of my invention. Fig. 2 is a vertical longitudinal section. Fig. 5 is a transverse section of the revolving separator. Figs. 3, 4, and 6 are details.

The working parts of my machine are supported upon a frame, A, which in turn is sustained by the ground-wheels B and caster-wheels $a$, Figs. 1 and 2. The shovel C, which excavates the hill, is suspended upon the adjusting-levers $b$ at the rear, and chains $c$ or equivalent devices at the forward end. The levers $b$ are pivoted to a suitable portion of the frame of the machine, and extend upward far enough to be convenient to the hand of the operator occupying the seat L. The shovel C is thus, by a forward movement of the levers, adjustable simultaneously vertically and to the rear, as indicated by dotted lines in Fig. 2. By this means it is allowed to pass obstructions readily, since, instead of catching under impediments, and thereby breaking some portion of the machine, it is allowed to retreat with relation to the forward motion of the digger, and at the same time rise and pass the obstruction.

It will be observed that the operator has perfect control of the shovel by means of the lever $b$, which forces it into the earth, the weight of the soil and the forward movement of the machine drawing it under and retaining it till it meets an obstruction or is raised by the lever. If found necessary, a suitable stop may be attached to the lever $b$ to lock the shovel in its upward position.

Side plows, I, are provided upon the forward part of the machine to cut away the sides of the hill and push that portion of the earth beyond the reach of the shovel C. These plows are pivoted angularly to the shanks $q$, as seen in Fig. 5, so as to rise and fall in a vertical direction, and their adjustment is controlled by chains $r$ or similar devices. A brace, $s$, is secured to the plow, which bears against the shank $q$, and thus stiffens the point of the former.

The caster-wheels $a$, which support the forward portion of the machine, are made adjustable vertically by any convenient device, and the depth to which the plows I and shovel C enter the earth thus in a measure regulated. The horizontal swing of these casters adds to the convenience of turning the machine in the field. The sides of the shovel C are made sufficiently deep to stiffen it and conduct the earth and potatoes upon the endless apron D, by which they are conveyed through the inclined chute $h'$ to the revolving raddle or separator G. The roller $d$, which sustains the apron at the lower end, has bearings upon the shovel C, and, therefore, rise and retreat with the latter, while the chute-boards H at the sides of the apron, being pivoted at the upper end and lying upon the shovel at the lower, rise and fall freely, also, as indicated in dotted lines in Fig. 2. Cleats $x$ are secured to the apron at suitable intervals to assist in elevating the earth. To take up the slack of the apron occasioned by the retreat of the roller $d$, I provide the roller $h$ or other suitable device, the bearings of which may be attached either to the shovel, as shown, or to the chute-boards H. This roller lifts the apron from the ground or over obstructions when the shovel is raised. The drum $e$, which drives the apron, is operated by bevel-gears $f$ $f'$ $g$ $g'$ upon shafts $i$ $i'$ $j$ $j'$, Figs. 1 and 2, the latter shafts being parallel with the common axis of the ground-wheels B, and driven by them by means of the spur-wheels and pinions $k$, Fig. 1. The shafts $i$ $i'$ extend to the rear of the machine and carry spur-wheels $l$ $l'$, which mesh into a gear formed upon the periphery of the separator G.

It will be observed that the separator and carrier-apron are driven from both sides of the machine by means of the duplicated shafts $i$ and gears $f$ and $g$, by which arrangement I obtain a much more equable motion, and also balance the weight of the parts better upon the ground-wheels.

The cylindrical revolving separator G consists of rings $m$, to which are attached rods or slats $n$, and two or more of these rings are provided with grooves or rabbets, into which rollers $o$ are fitted. These rollers have bearings upon segments $p$, which are attached to the frame of the machine, and thus sustain the separator, the grooves in the rings preventing end motion. One of the rings $m$ has a spur-gear formed upon it, worked by the pinions $l\,l'$, as before described. I purpose to so construct the separator that every alternate slat may be removed; or, in other words, provision is made for introducing a slat between each of the fixed ones, as shown in Fig. 5. By this means the device may be adapted to screen the earth from turnips and roots of various sizes.

In order to make the drive-wheels B independent in action, the shaft $j\,j'$ is made in two sections, the inner ends of which are loosely embraced by the collar $t$, Figs. 1 and 3. This collar is sustained in a bearing, $v$, attached to the frame of the machine, and is provided with a ratchet upon each opposite face, as indicated in Figs. 3 and 6—one right hand and one left hand. The sleeves $w$ are fast upon the shafts $j\,j'$ and sustain sliding pawls $a'$, which are forced inward against the ratchets $t$ by springs $b'$. Thus the shafts $j\,j'$ are provided with a bearing in the collar $t$, which in turn is supported by the bracket $v$, while at the same time the shafts are independent through the operation of the ratchets. Both ground-wheels thus actuate the moving parts during a forward movement of the machine, but are independent in turning around.

I have shown two bevel-pinions formed upon the collar $t$, for the purpose of communicating motion to a vine-puller, when used upon the potato-digger.

The shifting bar $c'$, Fig. 1, is provided with a fork, $e'$, which enters a groove in the hub of the gear $g'$, and its opposite end bears against the hub of the gear $g$. Thus these gears, which move upon splines upon the shafts, are thrown out of mesh with the pinions upon $i\,i'$ by a movement of the lever $d$, which is located near the operator. A spring, $n'$, returns them.

The operation of my invention is as follows: The plows and caster-wheels having been adjusted to the proper point, the shovel C is forced into the earth by means of the lever $b$, the draft upon it retaining it under the soil. As the hills of potatoes are excavated, they are elevated by the carrier D and delivered to the separator G, through which the dirt is screened, while the potatoes or roots are delivered at the rear of the machine either upon the ground or into a receptacle provided for the purpose.

What I claim as my invention is—

1. The shovel C, suspended by the adjusting-lever $b$ and chains $c$, whereby it is capable of a yielding adjustment, both vertically and to the rear, for the purposes set forth.

2. The combination of an excavating shovel or plow, an endless carrier-apron, and a revolving screen, operating substantially as and for the purposes set forth.

3. The revolving separator G, in this class of machines, when each alternate slat $n$ is detachable, for the purpose of changing the gage of the screen.

4. The auxiliary plows I, having their rear ends pivoted to the shanks $q$, and their forward ends suspended by vertically-yielding rods or chains $r$, for the purposes set forth.

5. The revolving apron D, in combination with the pivoted chute-boards H and yielding shovel C, when either of the latter are provided with a self-adjusting slack-lifter, $h$, arranged to operate substantially as described.

6. The coupling-collar $t$, provided with ratchet-teeth upon each face, in combination with the shafts $j\,j'$ and hanger $v$, for the purposes set forth.

LEANDER BERRY.

Witnesses:
 DANL. L. JOHNSTON,
 F. H. CLEMENT.